United States Patent
Hori et al.

(10) Patent No.: US 11,241,756 B2
(45) Date of Patent: Feb. 8, 2022

(54) JOINING METHOD

(71) Applicant: NIPPON LIGHT METAL COMPANY, LTD., Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 317 days.

(21) Appl. No.: 16/607,055

(22) PCT Filed: Nov. 2, 2017

(86) PCT No.: PCT/JP2017/039723
§ 371 (c)(1),
(2) Date: Oct. 21, 2019

(87) PCT Pub. No.: WO2019/021501
PCT Pub. Date: Jan. 31, 2019

(65) Prior Publication Data
US 2021/0402510 A1    Dec. 30, 2021

(30) Foreign Application Priority Data

Jul. 25, 2017  (JP) .............................. JP2017-143976

(51) Int. Cl.
*B23K 20/12*        (2006.01)
(52) U.S. Cl.
CPC ........ *B23K 20/1265* (2013.01); *B23K 20/122* (2013.01)
(58) Field of Classification Search
CPC .......................................... B23K 20/12–1295
(Continued)

(56) References Cited

U.S. PATENT DOCUMENTS

| | | | |
|---|---|---|---|
| 6,193,137 B1 * | 2/2001 | Ezumi .................. | B23K 20/122 228/112.1 |
| 6,250,037 B1 * | 6/2001 | Ezumi .................. | B21C 23/145 52/592.1 |

(Continued)

FOREIGN PATENT DOCUMENTS

| | | | |
|---|---|---|---|
| CN | 105358285 A | 2/2016 | |
| EP | 2067563 A1 * | 6/2009 | ........... B23K 20/126 |

(Continued)

OTHER PUBLICATIONS

Office Action for Chinese Patent Application No. 201780089990.2, dated Dec. 28, 2020.

(Continued)

*Primary Examiner* — Kiley S Stoner
(74) *Attorney, Agent, or Firm* — Merchant & Gould P.C.

(57) ABSTRACT

An edge of each of a first metal member and a second metal member is formed to have a U-shaped cross section with a first horizontal plate projecting from a base edge of a vertical plate, and with a second horizontal plate projecting from a top edge of the vertical plate. The second metal member includes a projecting part. The joining method includes: an abutting step of forming an abutted part by abutting a front surface of the first horizontal plate the first metal member against a second side surface of the second metal member; and a joining step of performing friction stir welding of the first metal member and the second metal member by inserting a stirring pin from the projecting part and moving a joining rotating tool along an inner corner at the top edge of the vertical plate of the second metal member while making only the stirring pin in contact with the first metal member and the second metal member.

7 Claims, 7 Drawing Sheets

(58) Field of Classification Search
USPC .............................. 228/112.1–114.5, 2.1–2.3
See application file for complete search history.

(56) References Cited

U.S. PATENT DOCUMENTS

| | | | | |
|---|---|---|---|---|
| 6,378,264 | B1* | 4/2002 | Kawasaki | B23K 20/122 52/633 |
| 6,581,819 | B1* | 6/2003 | Aota | B23K 33/00 228/112.1 |
| 6,676,008 | B1* | 1/2004 | Trapp | B23K 20/1255 228/112.1 |
| 7,416,102 | B1* | 8/2008 | Trapp | B23K 20/1225 228/112.1 |
| 8,857,696 | B1* | 10/2014 | Merah | B23K 20/1265 228/2.1 |
| 2002/0028341 | A1* | 3/2002 | Ezumi | B23K 20/122 428/544 |
| 2002/0148879 | A1* | 10/2002 | Ezumi | B23K 20/122 228/112.1 |
| 2003/0042293 | A1* | 3/2003 | Ezumi | B23K 33/00 228/112.1 |
| 2004/0065716 | A1* | 4/2004 | Young | B23K 20/1265 228/112.1 |
| 2004/0134971 | A1* | 7/2004 | Narita | B23K 20/122 228/112.1 |
| 2009/0072007 | A1* | 3/2009 | Nagano | B23K 20/1255 228/112.1 |
| 2010/0068550 | A1* | 3/2010 | Watson | B23K 33/004 428/586 |
| 2011/0132968 | A1* | 6/2011 | Nakagawa | B29C 66/81427 228/112.1 |
| 2014/0119814 | A1* | 5/2014 | Osikowicz | B23K 20/1225 403/270 |
| 2014/0166731 | A1 | 6/2014 | Seo et al. | |
| 2016/0325374 | A1* | 11/2016 | Hori | B23K 20/124 |
| 2017/0001257 | A1 | 1/2017 | Seo et al. | |
| 2020/0078883 | A1* | 3/2020 | Seo | B23K 20/122 |

FOREIGN PATENT DOCUMENTS

| | | | | |
|---|---|---|---|---|
| JP | H11-320128 | A | | 11/1999 |
| JP | 2003001440 | A * | 1/2003 | |
| JP | 2003-326375 | A | | 11/2003 |
| JP | 2003326375 | A * | 11/2003 | |
| JP | 2004261813 | A * | 9/2004 | |
| JP | 2005074497 | A * | 3/2005 | |
| JP | 4463183 | B2 * | 5/2010 | |
| JP | 2013-049072 | A | | 3/2013 |
| JP | 2016128178 | A * | 7/2016 | B23K 20/1265 |
| JP | 6052236 | B2 * | 12/2016 | |
| JP | 6052237 | B2 * | 12/2016 | |
| JP | 2017-019306 | A | | 1/2017 |
| JP | 6090186 | B2 * | 3/2017 | |
| JP | 6090186 | B2 | | 3/2017 |
| JP | 2018083217 | A * | 5/2018 | |
| JP | 2018094568 | A * | 6/2018 | |
| JP | 2018094569 | A * | 6/2018 | |
| JP | 2018199141 | A * | 12/2018 | |
| JP | 2020097046 | A * | 6/2020 | |
| WO | WO-2015114975 | A1 * | 8/2015 | B23K 20/128 |
| WO | WO-2016186134 | A1 * | 11/2016 | B23K 20/1245 |
| WO | WO-2017119232 | A1 * | 7/2017 | F28D 1/06 |
| WO | WO-2020208844 | A1 * | 10/2020 | B23K 20/12 |

OTHER PUBLICATIONS

International Search Report for No. PCT/JP2017/039723, dated Dec. 19, 2017.

* cited by examiner

JOINING METHOD

This application is a National Stage Application of PCT/JP2017/039723, filed Nov. 2, 2017, which claims benefit of priority to Japanese Patent Application No. 2017-143976, filed Jul. 25, 2017, which applications are incorporated herein by reference. To the extent appropriate, a claim of priority is made to each of the above disclosed applications.

TECHNICAL FIELD

The present invention relates to a joining method of joining metal members together by friction stir welding.

BACKGROUND ART

Patent Literature 1 discloses a technique in which two metal members abutted together at a right angle are joined together by friction stir welding with a joining rotating tool inserted in an inner corner between the two abutted metal members. FIG. 13 is a cross-sectional view illustrating the conventional friction stir welding method. According to the conventional friction stir welding method, a joining rotating tool 110 performs the friction stir welding on an abutted part J formed by abutting an end surface of a metal member 101 and a side surface of a metal member 102.

The joining rotating tool 110 includes: a holding block 111 formed in the shape of a triangular prism; and a stirring pin 112 rotatable relative to the holding block 111 while penetrating the holding block 111. The joining is performed by: rotating the stirring pin 112 with the holding block 111 being in contact with side surfaces of the respective metal members 101, 102.

CITATION LIST

Patent Literature

Patent Literature 1: Japanese Patent Application Publication No. H11-320128

SUMMARY OF INVENTION

Technical Problem

The conventional friction stir welding has a risk that the holding block 111 scrapes the metal members 101, 102, since the joining is performed with the holding block 111 pressed against the metal members 101, 102. Furthermore, the existence of the holding block 111 makes it impossible to visually check a joined portion.

If the friction stir welding were performed without the holding block 111, plastically fluidized metal may easily overflow to the outside of the inner corner, to have shortage of metal in the inner corner.

From these viewpoints, an object of the present invention is to provide a joining method which inhibits damage on the metal members during the joining and appropriately join the metal members.

Solution to Problem

To solve the above problems, the present invention provides a joining method of joining a first metal member with a second metal member by friction stir welding using a joining rotating tool which includes a stirring pin. At least an edge of each of the first and second metal members is formed to have a U-shaped cross section with a first horizontal plate projecting from a base edge of a first side surface of a vertical plate, and with a second horizontal plate projecting from a top edge of the first side surface of the vertical plate. The second metal member includes a projecting part projecting from a top edge of the vertical plate in a longitudinal direction of the vertical plate. The joining method includes: an abutting step of forming an abutted part by abutting a front surface of the first horizontal plate of the first metal member against a second side surface of the vertical plate of the second metal member with a second side surface of the vertical plate of the first metal member and a front surface of the first horizontal plate of the second metal member made flush with each other; and a joining step of performing friction stir welding to the abutted part between the first metal member and second metal member by inserting the stirring pin from the projecting part and moving the joining rotating tool along an inner corner at the top edge of the vertical plate of the second metal member while making only the stirring pin in contact with the first metal member and the second metal member.

Unlike the conventional joining method, the above-discussed joining method makes only the stirring pin into contact with the metal members without using the holding block in the joining rotating tool, and thus inhibits damage on the metal members during the joining. In addition, no use of the holding block in the joining rotating tool makes it possible to visually check the joined portion, and thereby to enhance working efficiency. Furthermore, the provision of the projecting part to the second metal member and the performing of the joining step through the projecting part solves the shortage of metal in the inner corner. Moreover, the performing of the friction stir welding with only the stirring pin made in contact with the first and second metal reduces load on a friction-stirring apparatus.

To solve the above problems, the present invention provides a joining method of joining a first metal member with a second metal member by friction stir welding using a joining rotating tool which includes a stirring pin. At least an edge of each of the first metal member and the second metal member is formed to have a U-shaped cross section with a first horizontal plate projecting from a base edge of a first side surface of a vertical plate, and with a second horizontal plate projecting from a top edge of the first side surface of the vertical plate. The first metal member includes a projecting part projecting outward from a front surface of the first horizontal plate. The joining method includes: an abutting step of forming an abutted part by abutting the front surface of the first horizontal plate of the first metal member against a second side surface of the vertical plate of the second metal member with a second side surface of the vertical plate of the first metal member and a front surface of the first horizontal plate of the second metal member made flush with each other, and with the projecting part of the first horizontal plate of the first metal member engaged with a top edge of the vertical plate of the second metal member; and a joining step of performing friction stir welding to the abutted part between the first metal member and the second metal member by inserting the stirring pin from the projecting part and moving the joining rotating tool along an inner corner at the top edge of the vertical plate of the second metal member while making only the stirring pin in contact with the first metal member and the second metal member.

Unlike the conventional joining method, the above-discussed joining method makes only the stirring pin into contact with the metal members without using the holding block in the joining rotating tool, and thus inhibits damage on the metal members during the joining. In addition, no use of the holding block in the joining rotating tool makes it possible to visually check the joined portion, and thereby to enhance working efficiency. Furthermore, the provision of the projecting part to the first metal member and the performing of the joining step using the projecting part solves the shortage of metal in the inner corner. Moreover, the performing of the friction stir welding with only the stirring pin made in contact with the first and second metal members reduces load on a friction-stirring apparatus. Besides, the abutting of the first metal member against the second metal member with the projecting part of the first metal member engaged with the second metal member facilitates positioning the first metal member and the second metal member in the abutting step.

Furthermore, it is preferable that the second metal member includes a notch part in the top edge of the vertical plate, and in the abutting step the projecting part of the first metal member is engaged with the notch part of the second metal member.

The above-discussed joining method includes engaging the projecting part of the first metal member with the notch part of the second metal member each other, and thus facilitates positioning the first metal member and the second metal member in the abutting step.

To solve the above problems, the present invention provides a joining method of joining a first metal member with a second metal member by friction stirring using a joining rotating tool which includes a stirring pin. At least an edge of each of the first metal member and the second metal member is formed to have a U-shaped cross section with a first horizontal plate projecting from a base edge of a first side surface of a vertical plate, and with a second horizontal plate projecting from a top edge of the first side surface of the vertical plate. The first metal member includes a first projecting part projecting outward from a front surface of the first horizontal plate. The second metal member includes a second projecting part projecting from a top edge of the vertical plate in a longitudinal direction of the vertical plate. The joining method includes: an abutting step of forming an abutted part by abutting the front surface of the first horizontal plate of the first metal member against a second side surface of the vertical plate of the second metal member with a second side surface of the vertical plate of the first metal member and a front surface of the first horizontal plate of the second metal member made flush with each other, and with the first projecting part of the first horizontal plate of the first metal member abutted against the second projecting part of the top edge of the vertical plate of the second metal member; and a joining step of performing friction stir welding to the abutted part between the first metal member and the second metal member by inserting the stirring pin from the first projecting part and the second projecting part and moving the joining rotating tool along an inner corner at the top edge of the vertical plate of the second metal member while making only the stirring pin in contact with the first metal member and the second metal member.

Unlike the conventional joining method, the above-discussed joining method makes only the stirring pin into contact with the metal members without using the holding block in the joining rotating tool, and thus inhibits damage on the metal members during the joining. In addition, no use of the holding block in the joining rotating tool makes it possible to visually check the joined portion, and thereby to enhance working efficiency. Furthermore, the performing of the joining step through the projecting parts provided to the respective first metal member and second metal member solves the shortage of metal in the inner corner. Moreover, the performing of the friction stir welding with only the stirring pin made in contact with the first metal member and the second metal member reduces load on a friction-stirring apparatus. Besides, the abutting of the first metal member against the second metal member with the first and second projecting parts of the respective first metal member and the second metal member engaged with each other facilitates positioning the first metal member and the second metal member in the abutting step.

Furthermore, it is preferable that the first metal member and the second metal member are each an extruded member.

Such a manufacturing method facilitates producing the first metal member and the second metal member each having a projecting part.

Advantageous Effects of the Invention

The joining methods according to the present invention inhibit damage on the metal members during the joining and appropriately join the metal members.

DESCRIPTION OF EMBODIMENTS

First Embodiment

Hereinafter, embodiments of the present invention will be described in detail with reference to the accompanying drawings. To begin with, a description will be provided for a joining rotating tool F to be used in the embodiments.

Figure 1:
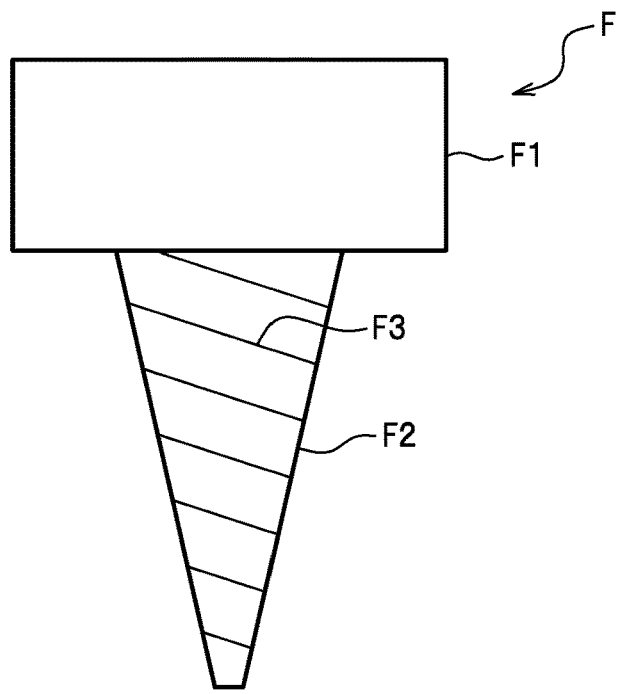
FIG. 1 is a side view of a joining rotating tool according to embodiments.

As illustrated in FIG. 1, the joining rotating tool F includes a connecting part F1 and a stirring pin F2. The joining rotating tool F is made of, for example, tool steel. The connecting part F1 is a part to be connected to a rotary shaft (whose illustration is omitted) of a friction-stirring apparatus. The connecting part F1 is formed in a column shape.

The stirring pin F2 is vertically attached to the connecting part F1, and is coaxial with the connecting part F1. The stirring pin F2 is gradually tapered with the increasing distance from the connecting part F1. A spiral groove F3 is engraved on the outer peripheral surface of the stirring pin F2. In the embodiments, as the joining rotating tool F is turned clockwise, the spiral groove F3 is formed counterclockwise as it runs from the base of the pin toward the top edge thereof.

It should be noted that when the joining rotating tool F is turned counterclockwise, it is preferable that the spiral groove F3 be formed clockwise as it runs from the base of the pin toward the distal end thereof. In the case where the spiral groove F3 is set like this, the spiral groove F3 guides plastically fluidized metal toward the distal end of the stirring pin F2 during friction stirring. This reduces an amount of metal to overflow to the outside of joined metal members (a first metal member 1 and a second metal member 2).

Friction stir welding using the joining rotating tool F is performed by: inserting only the rotating stirring pin F2 into the joined metal members; and moving the rotating stirring pin F2 with the connecting part F1 spaced out from the joined metal members. In other words, the friction stir welding is performed with the base end portion of the stirring pin F2 exposed.

Although a specific illustration is omitted, in a below-described joining step, the friction stirring can be performed by attaching the joining rotating tool F to a robot arm equipped with a rotational drive means, such as a spindle unit, in a distal end of the robot arm. The friction-stirring apparatus like this allows easy changes in the insertion position, insertion angle and the like of the joining rotating tool F.

Next, a description will be provided for the first metal member 1 and the second metal member 2 according to the present embodiment.

Figure 2:
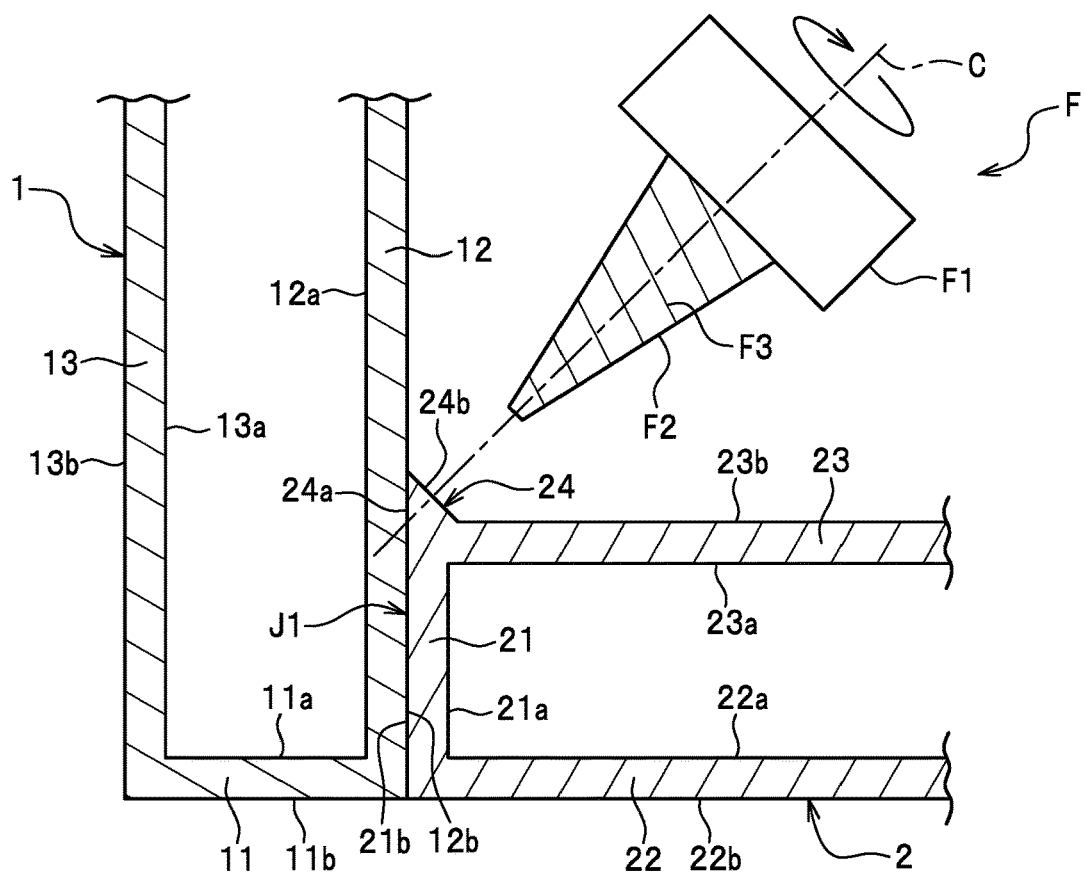
FIG. 2 cross-sectionally illustrates an abutting step in a joining method according to a first embodiment.

As illustrated in FIG. 2, the first metal member 1 and the second metal member 2 are each a metal member in a square tube shape. In the present embodiment, the first metal member 1 and the second metal member 2 are each made of an extruded member of an aluminum alloy. No specific limitation is, however, imposed on their material or manufacturing method as long as a friction-stirrable metal is used as their material. The material of the first metal member 1 and the second metal member 2 may be selected from, for example, aluminum, copper, copper alloys, titanium, titanium alloys, magnesium, magnesium alloys and the like on an as-needed basis.

The edge of the first metal member 1 is formed to have a U-shaped cross section. The first metal member 1 includes a vertical plate 11, a first horizontal plate 12 and a second horizontal plate 13. The vertical plate 11, the first horizontal plate 12 and the second horizontal plate 13 have the same thickness. The first metal member 1 may be formed such that at least an edge thereof has a U-shaped cross section.

In its cross-sectional view, the vertical plate 11 is formed in a rectangular plate shape. The vertical plate 11 includes an inner side surface 11a located inside, and an outer side surface 11b located outside. The first horizontal plate 12 projects vertically from a base edge of the inner side surface 11a of the vertical plate 11. In its cross-sectional view, the first horizontal plate 12 is formed in a rectangular plate shape. The first horizontal plate 12 includes a first back surface 12a located inside, and a first front surface 12b located outside. The second horizontal plate 13 projects vertically from a top edge of the inner side surface 11a of the vertical plate 11. In its cross-sectional view, the second horizontal plate 13 is formed in a rectangular plate shape. The second horizontal plate 13 includes a second back surface 13a located inside, and a second front surface 13b located outside. The first horizontal plate 12 and the second horizontal plate 13 face each other.

The edge of the second metal member 2 is formed to have a U-shaped cross section. The second metal member 2 includes a vertical plate 21, a first horizontal plate 22, a second horizontal plate 23, and a projecting part 24. The vertical plate 21, the first horizontal plate 22 and the second horizontal plate 23 have the same thickness. The second metal member 2 may be formed such that at least an edge thereof has a U-shaped cross-section.

In its cross-sectional view, the vertical plate 21 is formed to have a rectangular plate shape. The vertical plate 21 includes an inner side surface 21a located inside, and an outer side surface 21b located outside. The first horizontal plate 22 projects vertically from a base edge of the inner side surface 21a of the vertical plate 21. In its cross-sectional view, the first horizontal plate 22 is formed to have a rectangular plate shape. The first horizontal plate 22 includes a first back surface 22a located inside, and a first front surface 22b located outside. The second horizontal plate 23 projects vertically from a top edge of the inner side surface 21a of the vertical plate 21. In its cross-sectional view, the second horizontal plate 23 is formed to have a rectangular plate shape. The second horizontal plate 23 includes a second back surface 23a located inside, and a second front surface 23b located outside. The first horizontal plate 22 and the second horizontal plate 23 face each other.

The projecting part 24 projects from a top edge of the vertical plate 21 in a longitudinal direction of the vertical plate 21 (upward in the present embodiment). The projecting part 24 is formed to have an isosceles right triangle. The projecting part 24 is continuously formed in the depth direction in FIG. 2 (in a direction in which the second metal member 2 is extruded). It is preferable that the volume of the projecting part 24 is set to the extent of having no recessed groove formed in a front surface of a plasticized area (a joining part), or no projecting part 24 remained on the front surface thereof, after the joining step is performed. The projecting part 24 includes a contact surface 24a and an inclination surface 24b.

The contact surface 24a is a surface which comes into surface contact with the first front surface 12b of the first horizontal plate 12 of the first metal member 1. The contact surface 24a is situated on an extension line of the outer side surface 21b of the vertical plate 21 of the second metal member 2, and projects upward above the second front surface 23b of the second horizontal plate 23.

The inclination surface 24b is exposed to the outside and serves as a tool insertion surface into which the stirring pin F2 is inserted. The inclination surface 24b is formed between a top edge of the contact surface 24a and the second front surface 23b. An inclination angle of the inclination surface 24b may be set appropriately. In the present embodiment, the inclination surface 24b is inclined at an angle of 45° to a vertical plane and inclined at an angle of 45° to the contact surface 24a and the second front surface 23b.

Next, a description will be provided for a joining method according to the first embodiment of the present invention.

In the present embodiment, friction stir welding is performed to an abutted part J1 formed by abutting the first metal member 1 against the second metal member 2. In the joining method according to the present embodiment, an abutting step and a joining step are performed.

The abutting step is a step of forming the abutted part J1 by abutting the first metal member 1 against the second metal member 2. As illustrated in FIG. 2, in the abutting step, the abutted part J1 is formed by abutting the first front surface 12b of the first horizontal plate 12 of the first metal member 1 against the outer side surface 21b of the vertical plate 21 of the second metal member 2 with the outer side surface 11b of the vertical plate 11 of the first metal member 1 and the first front surface 22b of the first horizontal plate 22 of the second metal member 2 made flush with each other. In the abutting step, the contact surface 24a of the projecting part 24 and the first front surface 12b of the first horizontal plate 12 of the first metal member 1 are brought into surface contact with each other to form part of the abutted part J1. In the present embodiment, the cross-sectional line shape of the abutted part J1 is like a straight line. The abutting of the first metal member 1 against the second metal member 2 like this forms an inner corner at the top edge of the vertical plate 21 of the second metal member 2.

Figure 3:
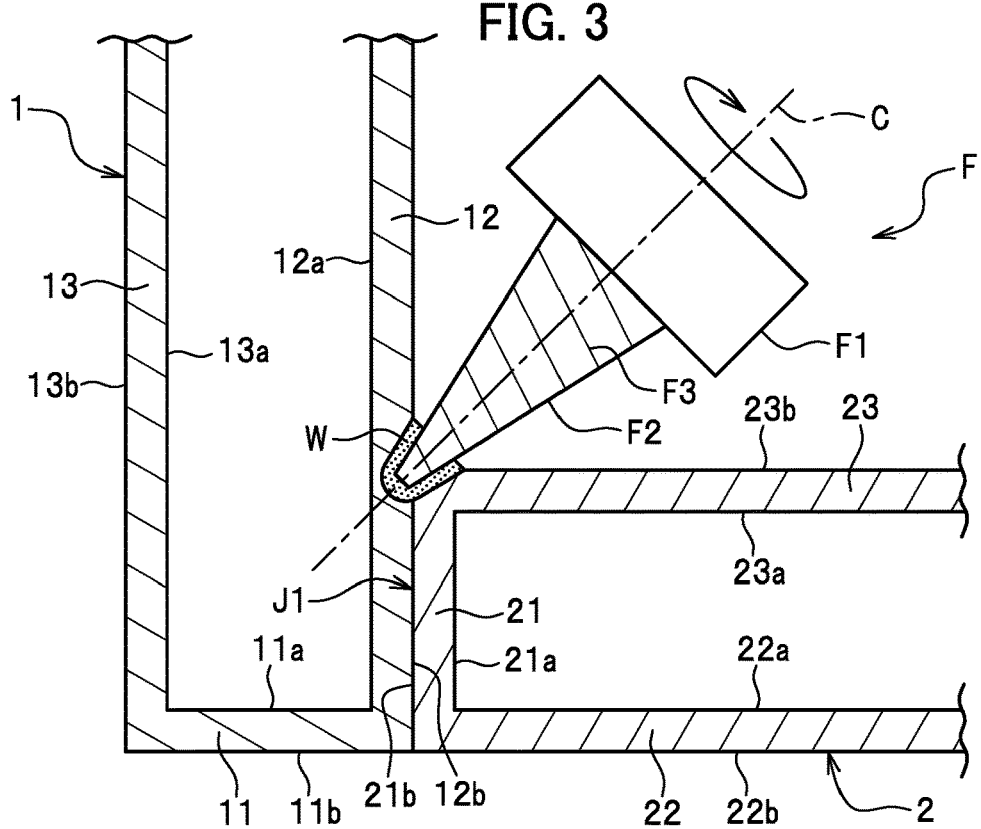
FIG. 3 cross-sectionally illustrates a joining step in the joining method according to the first embodiment.
Figure 4:
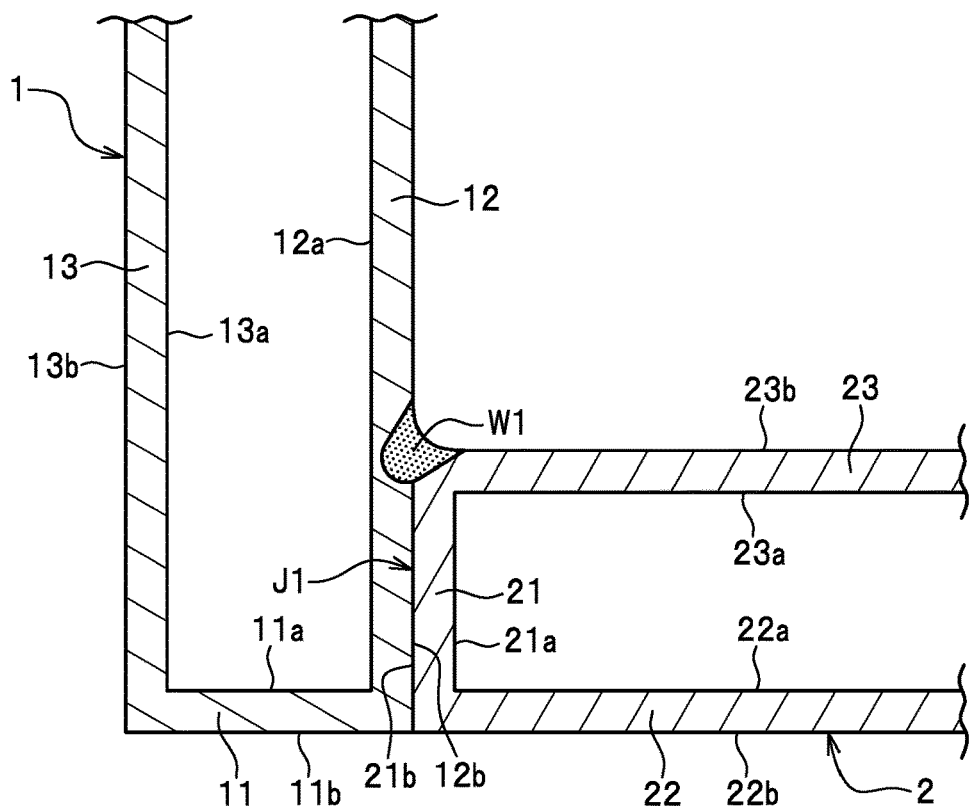
FIG. 4 cross-sectionally illustrates a condition obtained after the joining step in the joining method according to the first embodiment.

The joining step is a step of performing the friction stirring to the inner corner and the abutted part J1 using the joining rotating tool F. In the joining step, the friction stir welding is performed to the inner corner between the first metal member 1 and the second metal member 2 as well as the abutted part J1, by: inserting the clockwise rotating joining rotating tool F from the inclination surface 24b of the projecting part 24; and relatively moving the joining rotating tool F along the inner corner at the top edge of the vertical plate 21 of the second metal member 2. The moving direction of the joining rotating tool F is not specifically limited. In the present embodiment, the joining rotating tool F is relatively moved from the front side to the back side in FIG. 3. As illustrated in FIG. 3, in the joining step, the friction stirring is performed with only the stirring pin F2 made in contact with the first metal member 1 and the second metal member 2. In other words, the friction stirring is performed with the base end portion of the stirring pin F2 exposed. In the joining step, the friction stirring is performed with the joining rotating tool F inclined to the vertical plane so that the stirring pin F2 can be inserted into the inner corner and the abutted part J1. The insertion angle of the stirring pin F2 may be set as appropriate. In the present embodiment, a rotation axis C of the joining rotating tool F is inclined at an angle of 45° to the vertical plane. In other words, in the present embodiment, the rotation axis C of the joining rotating tool F is orthogonal to the inclination surface 24b (see FIG. 2). The rotation axis C of the joining rotating tool F is positioned so as to run through the center of the inclination surface 24b and the apex of the projecting part 24 (see FIG. 2). A plasticized area W1 as illustrated in FIG. 4 is formed in the track of the joining rotating tool F being moved. In a case where burrs are produced in the plasticized area W1, the burrs may be removed depending on the necessity. In the above-discussed step, the first metal member 1 is joined with the second metal member 2 to form an L-shape.

Unlike the conventional joining method, the above-discussed joining method according to the present embodiment makes only the stirring pin F2 into contact with the first metal member 1 and the second metal member 2 without using the holding block in the joining rotating tool F, and is thus capable of inhibiting damage on the first metal member 1 and the second metal member 2 during the joining. In addition, no use of the holding block in the joining rotating tool F makes it possible to visually check the joined portion, and thereby to enhance working efficiency. Furthermore, providing the projecting part 24 in the second metal member 2 and performing the joining step using the projecting part 24 solve the shortage of metal in the inner corner.

Moreover, the performing of the friction stir welding with only the stirring pin F2 made in contact with the first metal member 1 and the second metal member 2 reduces load on the friction-stirring apparatus.

Besides, since the second metal member 2 is an extruded member, the second metal member 2 including the projecting part 24 is easily produced.

Second Embodiment

Next, a description will be provided for a joining method according to a second embodiment of the present invention. The joining method according to the present embodiment is different from the joining method according to the first embodiment in that the first metal member 1 includes a projecting part 14. The joining method according to the second embodiment will be described focusing on what makes the second embodiment different from the first embodiment.

Figure 5:
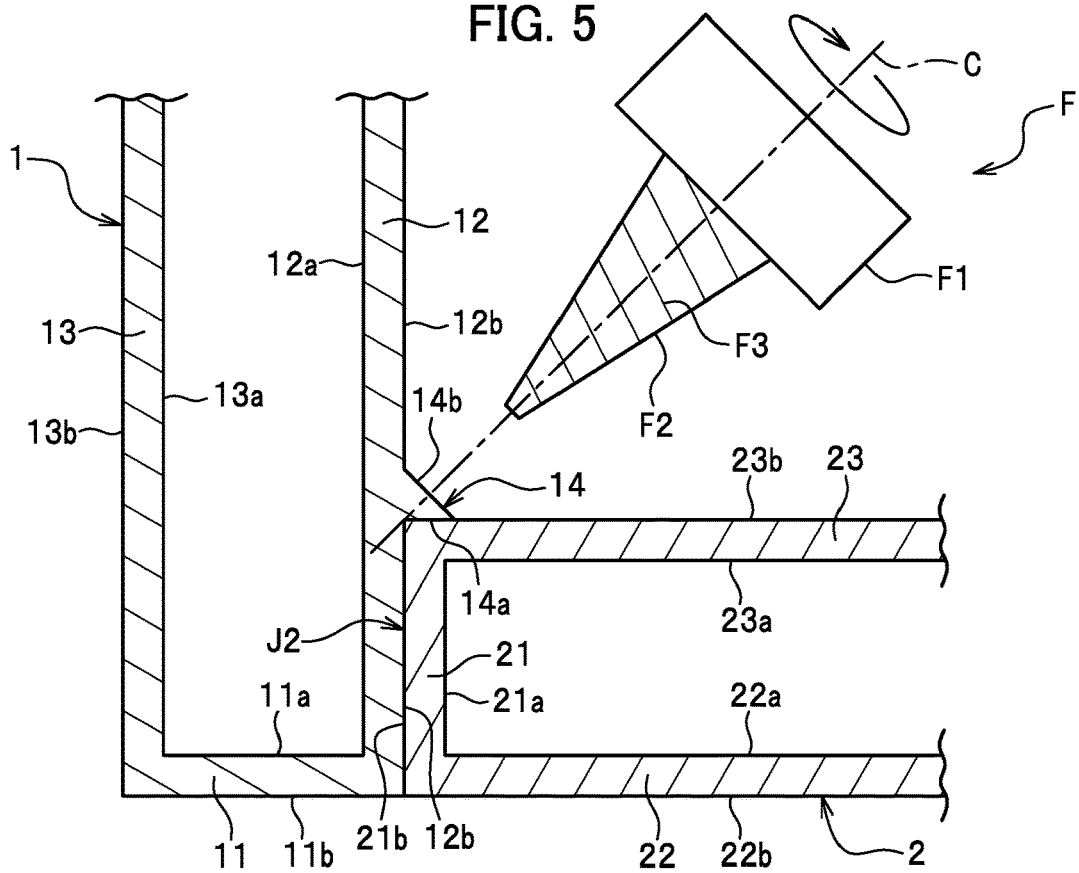
FIG. 5 a cross-sectionally illustrates an abutting step in a joining method according to a second embodiment.

As illustrated in FIG. 5, the first metal member 1 includes the projecting part 14. In the present embodiment, the first metal member 1 and the second metal member 2 are each made of an extruded member of an aluminum alloy. No specific limitation is, however, imposed on their material or manufacturing method as long as a friction-stirrable metal is used as their material.

The projecting part 14 projects outward from the first front surface 12b of the first horizontal plate 12 and is formed to have a cross section in an isosceles right triangle. It is preferable that the volume of the projecting part 14 be set to the extent of no recessed groove formed in the front surface of the plasticized area (the joining part), or no projecting part 14 remained on the front surface thereof, after the joining step is performed. The projecting part 14 includes a contact surface 14a and an inclination surface 14b.

The contact surface 14a is a surface which comes into surface contact with the top edge of the vertical plate 21 of the second metal member 2. The contact surface 14a is orthogonal to the first front surface 12b of the first metal member 1.

The inclination surface 14b is exposed to the outside and serves as a tool insertion surface into which the stirring pin F2 is inserted. The inclination surface 14b is formed between a top edge of the contact surface 14a and the first front surface 12b. An inclination angle of the inclination surface 14b may be set appropriately. In the present embodiment, the inclination surface 14b is inclined at an angle of 45° to the vertical plane and inclined at an angle of 45° to the contact surface 14a and the first front surface 12b.

Next, a description will be provided for the joining method according to the second embodiment of the present invention. In the present embodiment, the friction stirring is performed to an abutted part J2 formed by abutting the first metal member 1 against the second metal member 2. In the joining method according to the present embodiment, an abutting step and a joining step are performed.

The abutting step is a step of forming the abutted part J2 by abutting the first metal member 1 against the second metal member 2. As illustrated in FIG. 5, in the abutting step, the abutted part J2 is formed by abutting the first front surface 12b of the first horizontal plate 12 of the first metal member 1 against the outer side surface 21b of the vertical plate 21 of the second metal member 2 with the outer side surface 11b of the vertical plate 11 of the first metal member 1 and the first front surface 22b of the first horizontal plate 22 of the second metal member 2 made flush with each other, and with the projecting part 14 of the first horizontal plate 12 of the first metal member 1 engaged with the top edge of the vertical plate 21 of the second metal member 2. In the abutting step, the contact surface 14a of the projecting part 14 and the top edge of the vertical plate 21 of the second metal member 2 are brought into surface contact with each other to form part of the abutted part J2. In the present embodiment, the cross-sectional line shape of the abutted part J2 is like an inverted L. The abutting of the first metal member 1 against the second metal member 2 like this forms an inner corner at a top edge of the vertical plate 21 of the second metal member 2.

Figure 6:
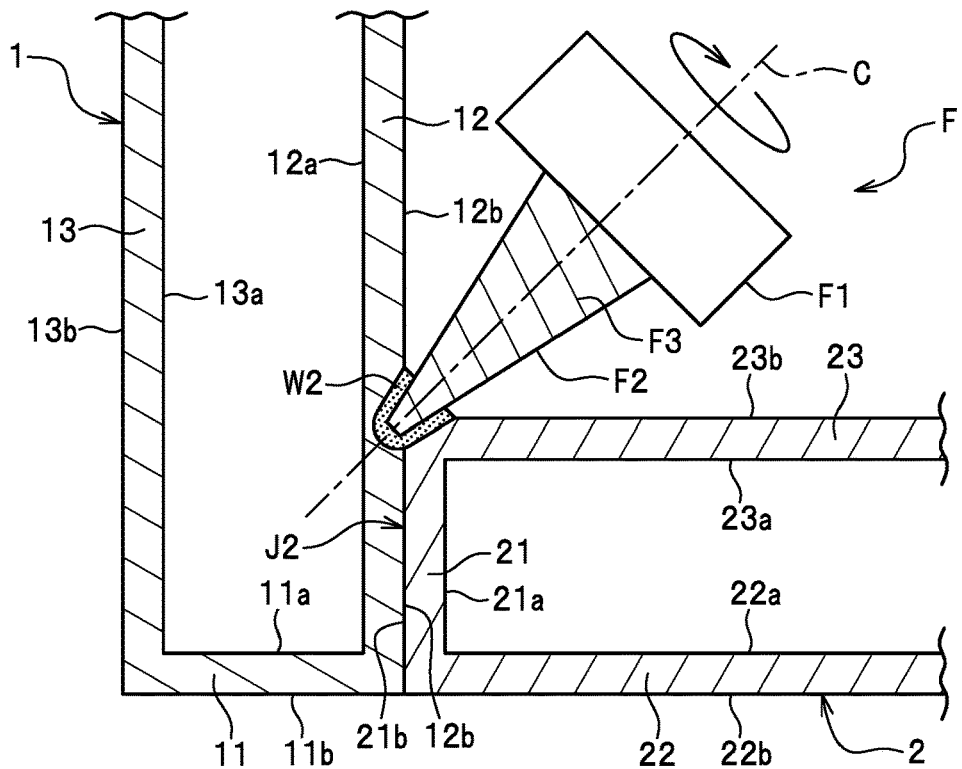
FIG. 6 cross-sectionally illustrates a joining step in the joining method according to the second embodiment.

The joining step is a step of performing the friction stirring to the inner corner and the butt part J2 using the joining rotating tool F. In the joining step, the friction stir welding is performed to the inner corner and the abutted part J2, by: inserting the clockwise rotating joining rotating tool F from the inclination surface 14b of the projecting part 14; and relatively moving the joining rotating tool F along the inner corner at the top edge of the vertical plate 21 of the second metal member 2. The moving direction of the joining rotating tool F is not specifically limited. In the present embodiment, the joining rotating tool F is relatively moved from the front side to the back side in FIG. 6. As illustrated in FIG. 6, in the joining step, the friction stirring is performed with only the stirring pin F2 made in contact with the first metal member 1 and the second metal member 2. In other words, the friction stirring is performed with the base end portion of the stirring pin F2 exposed. In the joining step, the friction stirring is performed with the joining rotating tool F inclined to the vertical plane so that the stirring pin F2 can be inserted into the inner corner and the abutted part J2. The insertion angle of the stirring pin F2 may be set as appropriate. In the present embodiment, the rotation axis C of the joining rotating tool F is inclined at an angle of 45° to the vertical plane. In other words, in the present embodiment, the rotation axis C of the joining rotating tool F is orthogonal to the inclination surface 14b (see FIG. 5). The rotation axis C of the joining rotating tool F is positioned so as to run through the center of the inclination surface 14b and the apex of the projecting part 14 (see FIG. 5). A plasticized area W2 is formed in the track of the joining rotating tool F being moved. In a case where burrs are produced in the plasticized area W2, the burrs may be removed depending on the necessity. In the above-discussed step, the first metal member 1 is joined with the second metal member 2 to form an L-shape.

Unlike the conventional joining method, the above-discussed joining method according to the present embodiment makes only the stirring pin F2 into contact with the first metal member 1 and the second metal member 2 without using the holding block in the joining rotating tool F, and is thus capable of inhibiting damage on the first metal member 1 and the second metal member 2 during the joining. In addition, no use of the holding block in the joining rotating tool F makes it possible to visually check the joined portion, and thereby to enhance working efficiency. Furthermore, providing the projecting part 14 in the first metal member 1 and performing the joining step using the projecting part 14 make it possible to solve the shortage of metal in the inner corner.

Moreover, the performing of the friction stir welding with only the stirring pin F2 made in contact with the first metal member 1 and the second metal member 2 makes it possible to reduce load on the friction-stirring apparatus.

Besides, since the first metal member 1 is an extruded member, the first metal member 1 including the projecting part 14 is easily produced.

First Modification of Second Embodiment

Next, a description will be provided for a first modification of the joining method according to the second embodiment of the present invention. The joining method of the first modification is different from the joining method of the second embodiment in that: the second metal member 2 includes a notch part 25; and the shape of a projecting part 15 is different from that of the projecting part 14. The joining method according to the first modification will be described focusing on what makes the first modification different from the second embodiment.

Figure 7:
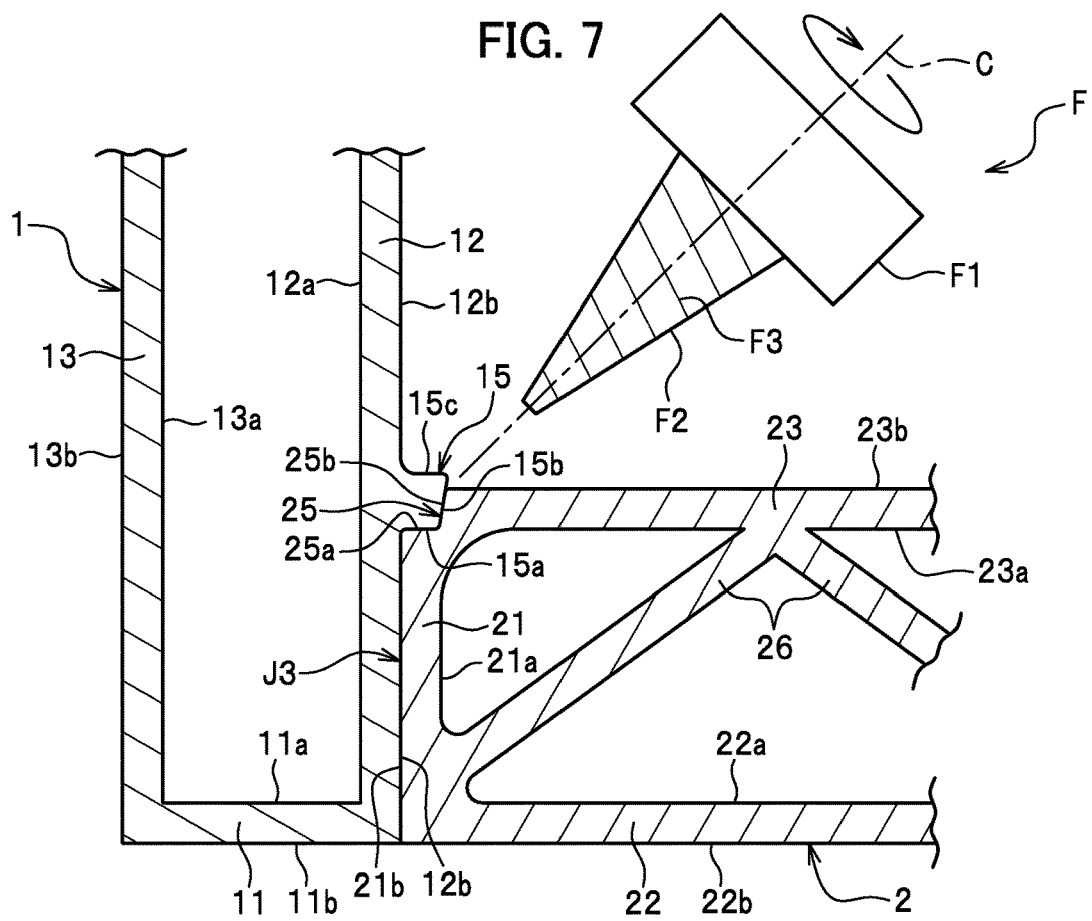
FIG. 7 cross-sectionally illustrates an abutting step in a first modification of the joining method according to the second embodiment.

As illustrated in FIG. 7, the second metal member 2 includes the notch part 25 in the top edge of the vertical plate 21. More specifically, the notch part 25 is formed by cutting an edge between the second front surface 23b of the second horizontal plate 23 and the outer side surface 21b of the vertical plate 21, into a shape which makes the notch part 25 have a substantially rectangular cross section. The notch part 25 includes a notch bottom surface 25a and a notch side surface 25b. An edge between the notch bottom surface 25a and the notch side surface 25b is chamfered in a curvy shape. The second metal member 2 includes ribs 26 which are formed therein and extend diagonally between the second horizontal plate 13 and the first horizontal plate 12 or the vertical plate 11.

The notch bottom surface 25a continues from the outer side surface 21b of the vertical plate 21 and extends in a direction orthogonal to the outer side surface 21b. An edge between the notch bottom surface 25a and the outer side surface 21b is chamfered in a curvy shape.

The notch side surface 25b is formed between the notch bottom surface 25a and the second front surface 23b. In the present embodiment, the notch side surface 25b slightly inclines such that the notch side surface 25b is farther away from the first metal member 1, with the increasing distance upward from the notch bottom surface 25a.

The projecting part 15 of the first metal member 1 is a part to be engaged with the notch part 25. The projecting part 15 projects outward from the first front surface 12b of the first horizontal plate 12, to have a substantially rectangular cross section. The projecting part 15 includes a first contact surface 15a, a second contact surface 15b and a rising surface 15c. Edges between respective neighboring twos of these surfaces are chamfered in a curvy shape.

The first contact surface 15a is a surface which projects vertically from the first front surface 12b of the first metal member 1 and comes into surface contact with the notch bottom surface 25a. The width dimension of the first contact surface 15a is substantially equal to the width dimension of the notch bottom surface 25a. An edge between the first contact surface 15a and the first front surface 12b is chamfered in a curvy shape.

The second contact surface 15b is a surface which projects upward from the top edge of the first contact surface 15a and comes into surface contact with the notch side surface 25b. The top edge of the second contact surface 15b projects upward beyond the second front surface 23b of the second metal member 2 and is exposed to the outside. Thereby, a step is formed by the second contact surface 15b and the second front surface 23b of the second metal member 2. The second contact surface 15b inclines at the same angle as the notch side surface 25b does.

The rising surface 15c is a surface which rises vertically from the first front surface 12b of the first metal member 1 and joins the first front surface 12b and the top edge of the second contact surface 15b. An edge between the rising surface 15c and the first front surface 12b is chamfered in a curvy shape.

Next, a description will be provided for a joining method according to the first modification of the present invention. In the first modification, the friction stir welding is performed to an abutted part J3 formed by abutting the first metal member 1 against the second metal member 2. In the joining method according to the present embodiment, an abutting step and a joining step are performed.

The abutting step is a step of forming the abutted part J3 by abutting the first metal member 1 against the second metal member 2. As illustrated in FIG. 7, in the abutting step, the abutted part J3 is formed by abutting the first front surface 12b of the first horizontal plate 12 of the first metal member 1 against the outer side surface 21b of the vertical plate 21 of the second metal member 2 with the outer side surface 11b of the vertical plate 11 of the first metal member 1 and the first front surface 22b of the first horizontal plate 22 of the second metal member 2 made flush with each other, and with the projecting part 15 of the first horizontal plate 12 of the first metal member 1 engaged with the notch part 25 of the second metal member 2. In the abutting step, the first contact surface 15a of the projecting part 15 and the notch bottom surface 25a are brought into surface contact with each other, as well as the second contact surface 15b and the notch side surface 25b are brought into surface contact with each other, to form part of the abutted part J3. In the present modification, the cross-sectional line shape of the abutted part J3 is like a crank. The abutting of the first metal member 1 against the second metal member 2 like this forms an inner corner at the top edge of the vertical plate 21 of the second metal member 2.

Figure 8:
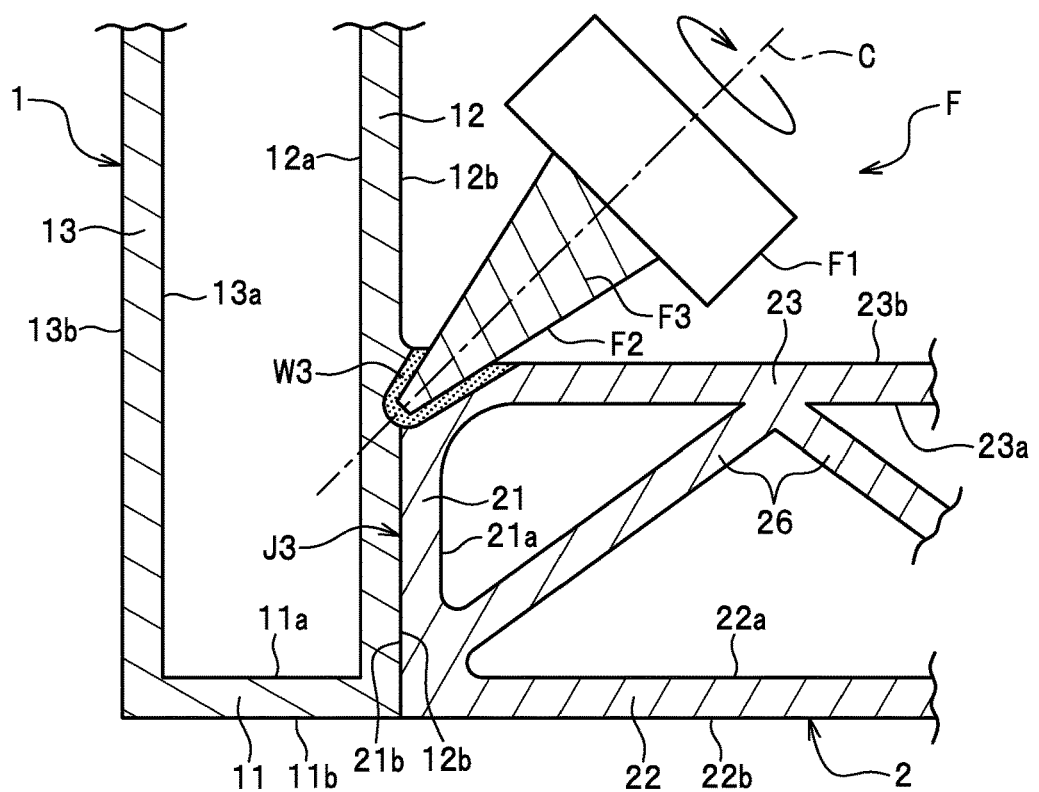
FIG. 8 cross-sectionally illustrates a joining step in the first modification of the joining method according to the second embodiment.

The joining step is a step of performing the friction stirring to the inner corner and the abutted part J3 using the joining rotating tool F. In the joining step, the friction stir welding is performed to the inner corner and the abutted part J3, by: inserting the clockwise rotating joining rotating tool F from the inner corner (the step) formed between the second contact surface 15b of the projecting part 15 and the second front surface 23b of the second metal member 2; and relatively moving the joining rotating tool F along the inner corner at the top edge of the vertical plate 21 of the second metal member 2. The moving direction of the joining rotating tool F is not specifically limited. In the present modification, the joining rotating tool F is relatively moved from the front side to the back side in FIG. 8. As illustrated in FIG. 8, in the joining step, the friction stirring is performed with only the stirring pin F2 made in contact with the first metal member 1 and the second metal member 2. In other words, the friction stirring is performed with the base end portion of the stirring pin F2 exposed. In the joining step, the friction stirring is performed with the joining rotating tool F inclined to the vertical plane so that the stirring pin F2 can be inserted into the inner corner and the abutted part J3. The insertion angle of the stirring pin F2 may be set as appropriate. In the present embodiment, the rotation axis C of the joining rotating tool F is inclined at an angle of 45° to the vertical plane. The rotation axis C of the joining rotating tool F is positioned so as to run through the inner corner (the step) between the second contact surface 15b and the second front surface 23b of the second metal member 2 (see FIG. 7). A plasticized area W3 is formed in the track of the joining rotating tool F being moved. In a case where burrs are produced in the plasticized area W3, the burrs may be removed depending on the necessity. In the above-discussed step, the first metal member 1 is joined with the second metal member 2 to form an L-shape.

The above-discussed joining method according to the present modification achieves substantially the same advantageous effects as the joining method according to the second embodiment. Furthermore, since the projecting part 15 of the first metal member 1 is engaged with the notch part 25 of the second metal member 2, the first metal member 1 and the second metal member 2 are easily positioned together in the abutting step.

Second Modification of Second Embodiment

Next, a description will be provided for a second modification of the joining method according to the second embodiment of the present invention. The joining method of the second modification is different from the joining method of the second embodiment in that: the second metal member 2 includes a notch part 27; and the shape of a projecting part 16 is different from that of the projecting part 14 for the second embodiment. The joining method of the second modification will be described focusing on what makes the second modification different from the second embodiment.

Figure 9:
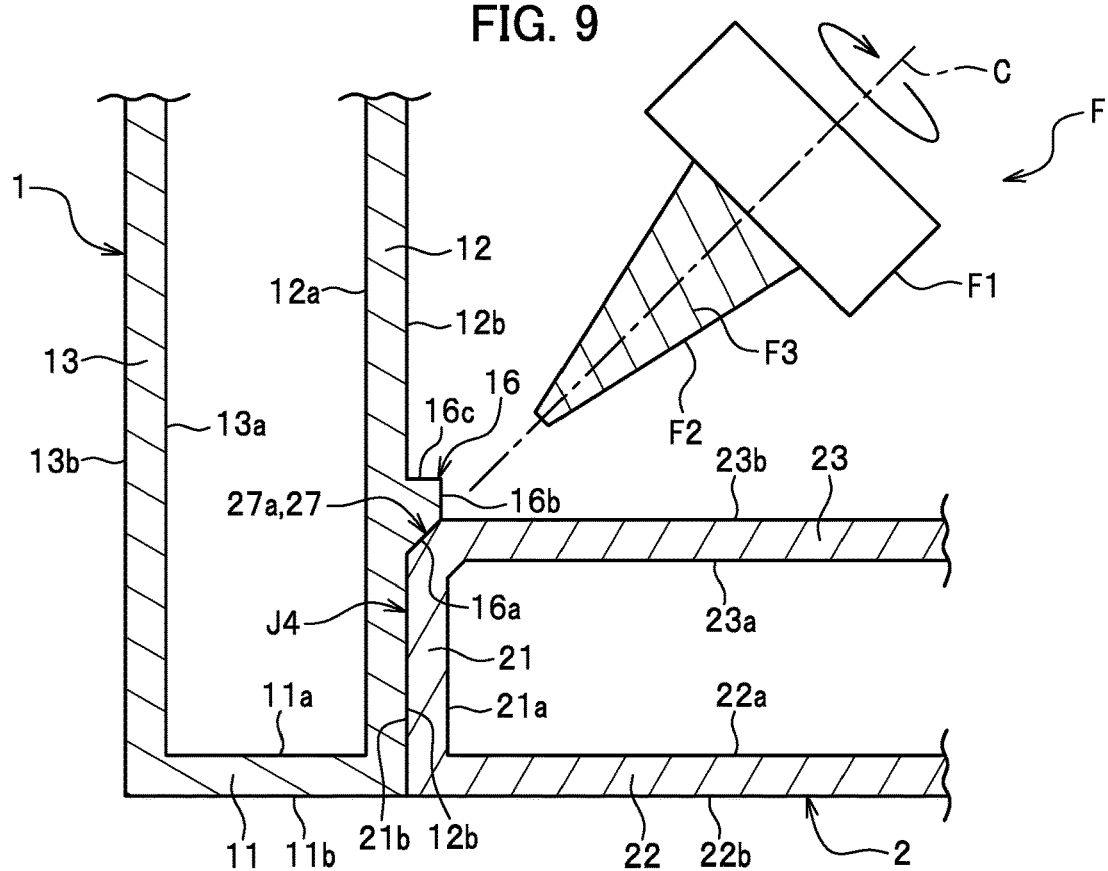
FIG. 9 cross-sectionally illustrates an abutting step in a second modification of the joining method according to the second embodiment.

As illustrated in FIG. 9, the second metal member 2 includes a notch part 27 in the top edge of the vertical plate 21. More specifically, the notch part 27 is formed by cutting the edge between the outer side surface 21b of the vertical plate 21 and the second front surface 23b of the second horizontal plate 23. The notch part 27 includes a notch inclination surface 27a.

The notch inclination surface 27a is a surface which comes into surface contact with the projecting part 16. The notch inclination surface 27a is formed between the outer side surface 21b of the vertical plate 21 and the second front surface 23b of the second horizontal plate 23. The inclination angle of the notch inclination surface 27a is not specifically limited. In the present embodiment, the notch inclination surface 27a is inclined at an angle of 45° to the vertical plane, as well as is inclined at an angle of 45° to the outer side surface 21b and the second front surface 23b.

The projecting part 16 of the first metal member 1 is a part to be engaged with the notch part 27. The projecting part 16 projects outward from the first front surface 12b of the first horizontal plate 12 and is formed to have a substantially trapezium. The projecting part 16 includes a contact surface 16a, a vertical surface 16b and a rising surface 16c.

The contact surface 16a is a surface which diagonally projects from the first front surface 12b of the first horizontal plate 12 and comes into surface contact with the notch inclination surface 27a. The inclination angle of the contact surface 16a is not specifically limited as long as the inclination angle thereof is comparable to that of the notch inclination surface 27a. In the present embodiment, the contact surface 16a is inclined at an angle of 45° to the vertical plane and inclined at an angle of 45° to the first front surface 12b.

The vertical surface 16b projects upward from a top edge of the contact surface 16a and extends vertically to the second front surface 23b of the second metal member 2. The vertical surface 16b projects upward beyond the second front surface 23b of the second metal member 2 and is exposed to the outside. Thereby, a step is formed by the vertical surface 16b and the second front surface 23b of the second metal member 2. The step is situated on the extension line of an abutted portion of the contact surface 16a against the notch inclination surface 27a.

The rising surface 16c is a surface which rises vertically from the first front surface 12b of the first horizontal plate 12 and joins the first front surface 12b and the edge of the vertical surface 16b.

Next, a description will be provided for a joining method according to the second modification of the present invention. In the present modification, the friction stir welding is performed to an abutted part J4 formed by abutting the first metal member 1 against the second metal member 2. In the joining method according to the present embodiment, an abutting step and a joining step are performed.

The abutting step is a step of forming the abutted part J4 by abutting the first metal member 1 against the second metal member 2. As illustrated in FIG. 9, in the abutting step, the abutted part J4 is formed by abutting the first front surface 12b of the first horizontal plate 12 of the first metal member 1 against the outer side surface 21b of the vertical plate 21 of the second metal member 2 with the outer side surface 11b of the vertical plate 11 of the first metal member 1 and the first front surface 22b of the first horizontal plate 22 of the second metal member 2 made flush with each other, and with the projecting part 16 of the first horizontal plate 12 of the first metal member 1 engaged with the notch part 27 of the second metal member 2. In the abutting step, the contact surface 16a of the projecting part 16 and the notch inclination surface 27a of the notch part 27 are brought into surface contact with each other to form part of the abutted part J4. In the present modification, the cross-sectional line shape of the abutted part J4 is a shape of a straight-line connected with an inclination line. The abutting of the first metal member 1 against the second metal member 2 like this forms an inner corner at the top edge of the vertical plate 21 of the second metal member 2.

Figure 10:
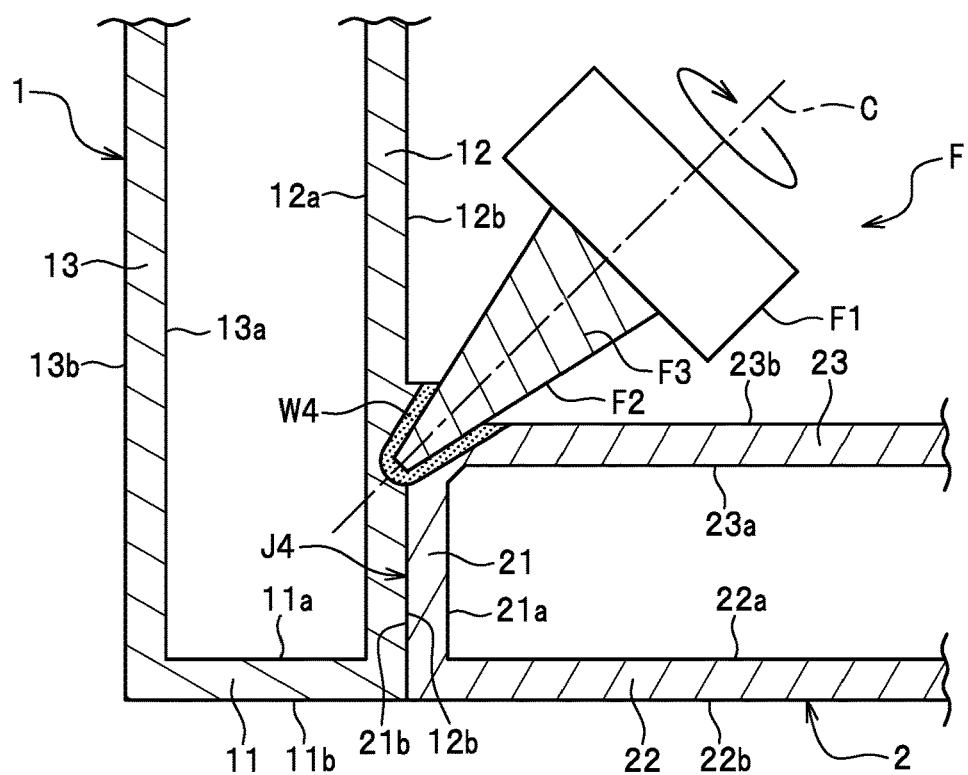
FIG. 10 cross-sectionally illustrates a joining step in the second modification of the joining method according to the second embodiment.

The joining step is a step of performing the friction stirring to the inner corner and the abutted part J4 using the joining rotating tool F. In the joining step, the friction stir welding is performed to the inner corner and the abutted part J4, by: inserting the clockwise rotating joining rotating tool F from the inner corner (the step) formed between the vertical surface 16b of the projecting part 16 and the second front surface 23b of the second metal member 2; and relatively moving the joining rotating tool F along the inner corner at the top edge of the vertical plate 21 of the second metal member 2. The moving direction of the joining rotating tool F is not specifically limited. In the present modification, the joining rotating tool F is relatively moved from the front side to the back side in FIG. 10. As illustrated in FIG. 10, in the joining step, the friction stirring is performed with only the stirring pin F2 made in contact with the first metal member 1 and the second metal member 2. In other words, the friction stirring is performed with the base end portion of the stirring pin F2 exposed. In the joining step, the friction stirring is performed with the joining rotating tool F inclined to the vertical plane so that the stirring pin F2 can be inserted into the inner corner and the abutted part J4. The insertion angle of the stirring pin F2 may be set as appropriate. In the present embodiment, the rotation axis C of the joining rotating tool F is inclined at an angle of 45° to the vertical plane. The rotation axis C of the joining rotating tool F is positioned so as to run through the inner corner (the step) between the vertical surface 16b and the second front surface 23b of the second metal member 2, as well as an abutted portion of the contact surface 16a of the projecting part 16 against the notch inclination surface 27a (see FIG. 9). A plasticized area W4 is formed in the track of the joining rotating tool F being moved. In a case where burrs are produced in the plasticized area W4, the burrs may be removed depending on the necessity. In the above-discussed step, the first metal member 1 is joined with the second metal member 2 to form an L-shape.

The above-discussed joining method according to the present modification achieves substantially the same advantageous effects as the joining method according to the second embodiment. Furthermore, since the projecting part 16 of the first metal member 1 is engaged with the notch part 27 of the second metal member 2, the first metal member 1 and the second metal member 2 are easily positioned together in the abutting step.

Third Embodiment

Next, a description will be provided for a joining method according to a third embodiment of the present invention. The joining method according to the present embodiment is different from the joining method according to the first embodiment in that the first metal member 1 includes a projecting part 17 while the second metal member 2 includes a projecting part 28. The joining method according to the third embodiment will be described focusing on what makes the third embodiment different from the first embodiment.

Figure 11:
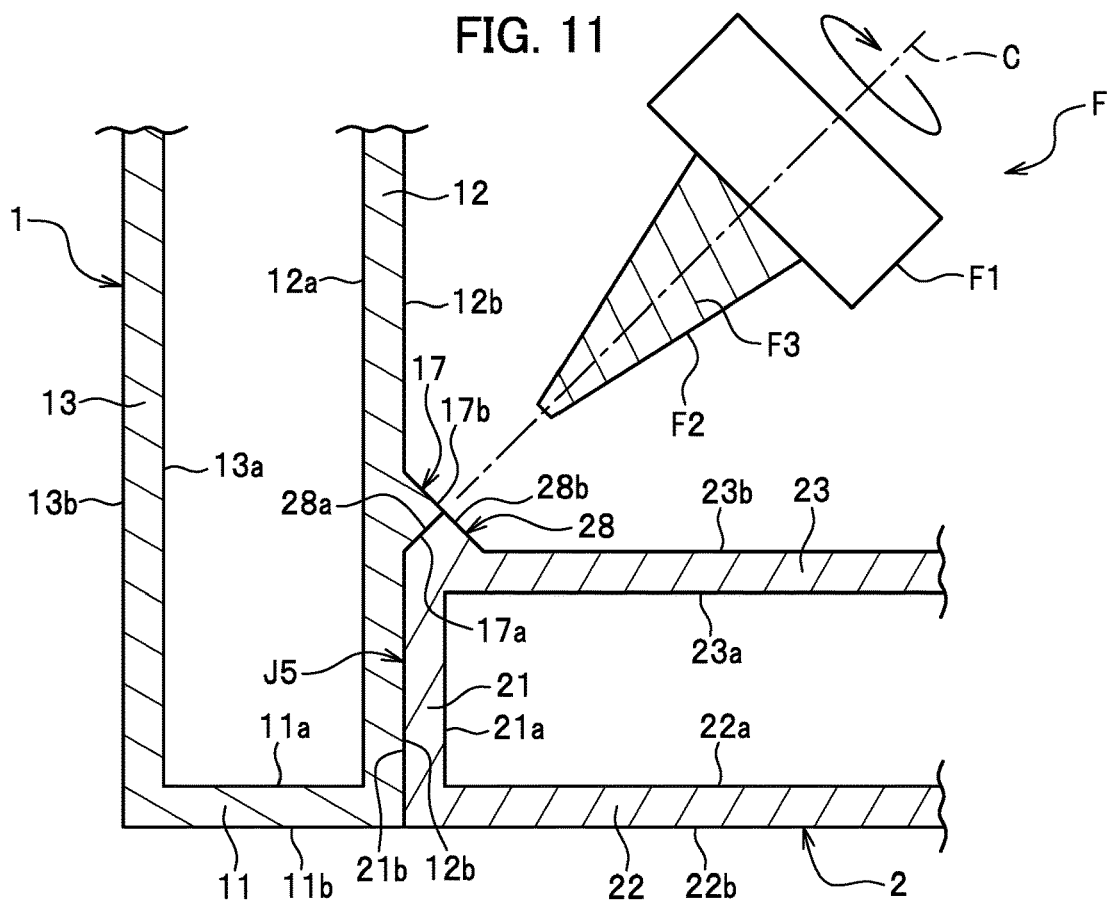
FIG. 11 cross-sectionally illustrates an abutting step in a joining method according to a third embodiment.

As illustrated in FIG. 11, the first metal member 1 includes the first projecting part 17. In the present embodiment, the first metal member 1 and the second metal member 2 are each formed from an extruded member of an aluminum alloy. No specific limitation is, however, imposed on their material or manufacturing method as long as a friction-stirrable metal is used as their material.

The first projecting part 17 projects outward from the first front surface 12b of the first horizontal plate 12 and is formed to have a cross section in an isosceles right triangle whose apex is laterally oriented. It is preferable that the volume of the first projecting part 17 be set to the extent of no recessed groove formed in the front surface of the plasticized area (the joining part), or no first projecting part 17 remained on the front surface thereof, after the joining step is performed. The first projecting part 17 includes a first contact surface 17a and a first inclination surface 17b. The first contact surface 17a and the first inclination surface 17b are inclined so as to be closer to each other with the increasing distance from the first front surface 12b, until to meet together at top edges thereof. The first contact surface 17a and the first inclination surface 17b are arranged line-symmetrically with respect to a horizontal axis running through the apex of the first projecting part 17.

The first contact surface 17a is a surface which projects diagonally from the first front surface 12b of the first metal member 1 and comes into surface contact with the second projecting part 28 of the second metal member 2. An inclination angle of the first contact surface 17a is not specifically limited. In the present embodiment, the first contact surface 17a is inclined at an angle of 45° to the vertical plane and inclined at an angle of 45° to the first front surface 12b.

The first inclination surface 17b is exposed to the outside and is a surface into which the stirring pin F2 is inserted. An inclination angle of the first inclination surface 17b is not specifically limited. In the present embodiment, the first inclination surface 17b is inclined at an angle of 45° to the vertical plane, as well as is inclined at an angle of 90° to the first contact surface 17a, and at an angle of 45° to the first front surface 12b.

The second metal member 2 includes the second projecting part 28. The second projecting part 28 projects from the top edge of the vertical plate 21 in the longitudinal direction of the vertical plate 21, and is formed to have a cross section in an isosceles right triangle whose apex is oriented upward. It is preferable that the volume of the second projecting part 28 beset to the extent of no recessed groove formed in the front surface of the plasticized area (the joining part), or no second projecting part 28 remained on the front surface thereof, after the joining step is performed. The second projecting part 28 includes a second contact surface 28a and a second inclination surface 28b. The second contact surface 28a and the second inclination surface 28b are inclined so as to be closer to each other with the increasing distance from the top edge of the vertical plate 21, until to meet together at top edges thereof. The second contact surface 28a and the second inclination surface 28b are arranged line-symmetrically with respect to a vertical axis running through the apex of the second projecting part 28.

The second contact surface 28a is a surface which projects diagonally from the top edge of the vertical plate 21 and comes into surface contact with the first contact surface 17a of the first projecting part 17. An inclination angle of the second contact surface 28a is not specifically limited. In the present embodiment, the second contact surface 28a is inclined at an angle of 45° to the vertical plane.

The second inclination surface 28b is exposed to the outside and is a surface into which the stirring pin F2 is inserted. An inclination angle of the second inclination surface 28b is not specifically limited. In the present embodiment, the second inclination surface 28b is inclined at an angle of 45° to the vertical plane, as well as is inclined at an angle of 90° to the second contact surface 28a, and at an angle of 45° to the second front surface 23b. When the first metal member 1 is abutted against the second metal member 2, the first inclination surface 17b and the second inclination surface 28b are flush with each other, to provide a surface into which the tool is inserted and which is inclined at an angle of 45° to both the first front surface 12b and the second front surface 23b.

Next, a description will be provided for the joining method according to the third embodiment of the present invention. In the present embodiment, the friction stir welding is performed to an abutted part J5 formed by abutting the first metal member 1 against the second metal member 2. In the joining method according to the present embodiment, an abutting step and a joining step are performed.

The abutting step is a step of forming the abutted part J5 by abutting the first metal member 1 against the second metal member 2. As illustrated in FIG. 11, in the abutting step, the abutted part J5 is formed by abutting the first front surface 12b of the first horizontal plate 12 of the first metal member 1 against the outer side surface 21b of the vertical plate 21 of the second metal member 2 with the outer side surface 11b of the vertical plate 11 of the first metal member 1 and the first front surface 22b of the first horizontal plate 22 of the second metal member 2 made flush with each other, and with the first projecting part 17 of the first horizontal plate 12 of the first metal member 1 abutted against the second projecting part 28 at the top edge of the vertical plate 21 of the second metal member 2. In the abutting step, the first contact surface 17a of the first projecting part 17 and the second contact surface 28a of the second projecting part 28 are brought into surface contact with each other to form part of the abutted part J5. In the present embodiment, the cross-sectional line shape of the abutted part J5 is a shape of a straight-line connected with an inclination line. The abutting of the first metal member 1 against the second metal member 2 like this forms an inner corner at the top edge of the vertical plate 21 of the second metal member 2.

Figure 12:
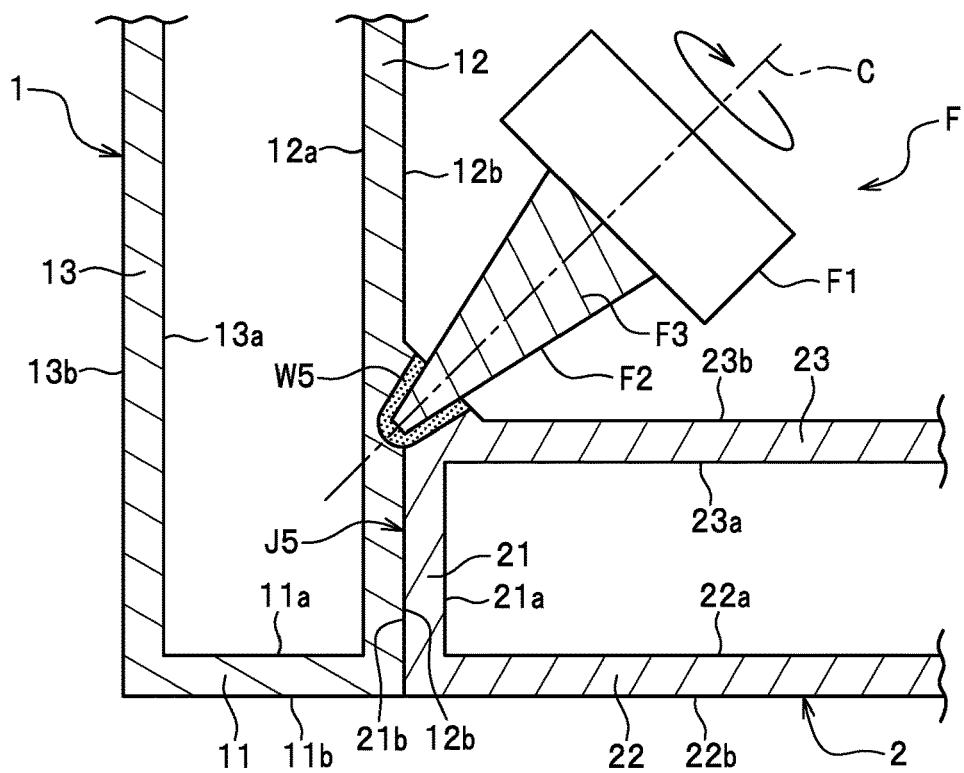
FIG. 12 cross-sectionally illustrates a joining step in the joining method according to the third embodiment.
Figure 13:
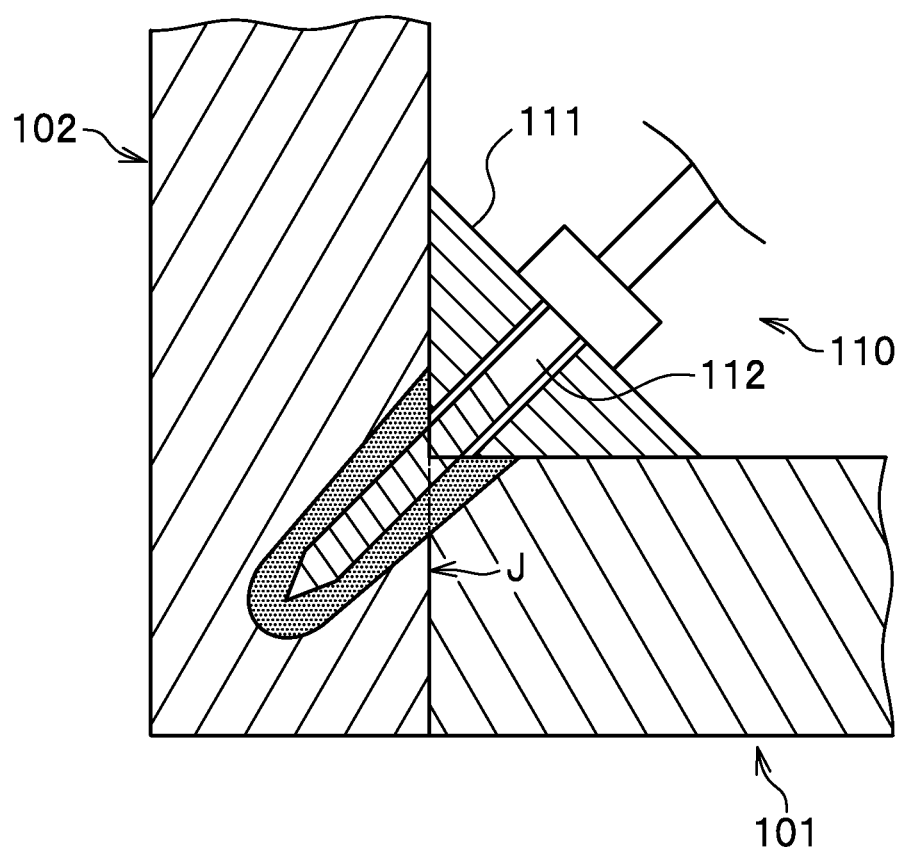
FIG. 13 cross-sectionally illustrates a conventional friction stir welding method.

The joining step is a step of performing the friction stirring to the inner corner and the abutted part J5 using the joining rotating tool F. In the joining step, the friction stir welding is performed to the inner corner and the abutted part J5, by: inserting the clockwise rotating joining rotating tool F from the first inclination surface 17b of the first projecting part 17 and the second inclination surface 28b of the second projecting part 28; and relatively moving the joining rotating tool F along the inner corner at the top edge of the vertical plate 21 of the second metal member 2. The moving direction of the joining rotating tool F is not specifically limited. In the present embodiment, the joining rotating tool F is relatively moved from the front side to the back side in FIG. 12. As illustrated in FIG. 12, in the joining step, the friction stirring is performed with only the stirring pin F2 made in contact with the first metal member 1 and the second metal member 2. In other words, the friction stirring is performed with the base end portion of the stirring pin F2 exposed. In the joining step, the friction stirring is performed with the joining rotating tool F inclined to the vertical plane so that the stirring pin F2 can be inserted into the inner corner and the abutted part J5. The insertion angle of the stirring pin F2 may be set as appropriate. In the present embodiment, the rotation axis C of the joining rotating tool F is inclined at an angle of 45° to the vertical plane. In other words, in the present embodiment, the rotation axis C of the joining rotating tool F is orthogonal to the first inclination surface 17b and the second inclination surface 28b (see FIG. 11). The rotation axis C of the joining rotating tool F is positioned so as to tun through the abutted portion of the first contact surface 17a against the second contact surface 28a (see FIG. 11). A plasticized area W5 is formed in the track of the joining rotating tool F being moved. In a case where burrs are produced in the plasticized area W5, the burrs may be removed depending on the necessity. In the above-discussed step, the first metal member 1 is joined with the second metal member 2 to form an L-shape.

Unlike the conventional joining method, the above-discussed joining methods according to the present embodiment makes only the stirring pin F2 into contact with the first and second metal members 1, 2 without using the holding block in the joining rotating tool F, and is thus capable of inhibiting damage on the first and second metal members 1, 2 during the joining. In addition, no use of the holding block in the joining rotating tool F makes it possible to visually check the joined portion, and thereby to enhance working efficiency. Furthermore, providing the first and second projecting parts 17, 28 to the respective first and second metal members 1, 2 and performing the joining step using the first and second projecting parts 17, 28 make it possible to solve the shortage of metal in the inner corner.

Moreover, the performing of the friction stir welding with only the stirring pin F2 made in contact with the first and second metal members 1, 2 reduces load on the friction-stirring apparatus.

Besides, since the first and second metal members 1, 2 are each an extruded member, the first and second metal members 1, 2 respectively including the first and second projecting parts 17, 28 are produced easily.

REFERENCE SIGNS LIST

1 first metal member
2 second metal member
11 vertical plate
11*a* inner side surface (first side surface)
11*b* outer side surface (second side surface)
12 first horizontal plate
12*a* first back surface
12*b* first front surface
13 second horizontal plate
13*a* second back surface
13*b* second front surface
14 projecting part
15 projecting part
16 projecting part
17 first projecting part
21 vertical plate
21*a* inner side surface
21*b* outer side surface
22 first horizontal plate
22*a* first back surface
22*b* first front surface
23 second horizontal plate
23*a* second back surface
23*b* second front surface
24 projecting part
25 notch part
27 notch part
28 second projecting part
F joining rotating tool
F2 stirring pin
J1 to J5 abutted part

What is claimed is:

1. A joining method of joining a first metal member with a second metal member by friction stir welding using a joining rotating tool which includes a stirring pin, at least an edge of each of the first metal member and the second metal member being formed to have a U-shaped cross section with a first horizontal plate projecting from a base edge of a first side surface of a vertical plate, and with a second horizontal plate projecting from a top edge of the first side surface of the vertical plate, the second metal member including a projecting part projecting from the top edge of the vertical plate in a longitudinal direction of the vertical plate, the joining method comprising:
an abutting step of forming an abutted part by abutting a front surface of the first horizontal plate of the first metal member against a second side surface of the vertical plate of the second metal member with a second side surface of the vertical plate of the first metal member and a front surface of the first horizontal plate of the second metal member made flush with each other; and
a joining step of performing friction stir welding to the abutted part between the first metal member and second metal member by inserting the stirring pin from the projecting part and moving the joining rotating tool along an inner corner at the top edge of the vertical plate of the second metal member while making only the stirring pin in contact with the first metal member and the second metal member.

2. A joining method of joining a first metal member with a second metal member by friction stir welding using a joining rotating tool which includes a stirring pin, at least an edge of each of the first metal member and the second metal member being formed to have a U-shaped cross section with a first horizontal plate projecting from a base edge of a first side surface of a vertical plate and with a second horizontal plate projecting from a top edge of the first side surface of the vertical plate, the first metal member including a projecting part projecting outward from a front surface of the first horizontal plate, the joining method comprising:
an abutting step of forming an abutted part by abutting the front surface of the first horizontal plate of the first metal member against a second side surface of the vertical plate of the second metal member with a second side surface of the vertical plate of the first metal member and a front surface of the first horizontal plate of the second metal member made flush with each other and with the projecting part of the first horizontal plate of the first metal member engaged with the top edge of the vertical plate of the second metal member; and
a joining step of performing friction stir welding to the abutted part between the first metal member and the second metal member by inserting the stirring pin from the projecting part and moving the joining rotating tool along an inner corner at the top edge of the vertical plate of the second metal member while making only the stirring pin in contact with the first metal member and the second metal member.

3. The joining method set forth in claim 2,
wherein the second metal member includes a notch part in the top edge of the vertical plate, and
wherein in the abutting step the projecting part of the first metal member is engaged with the notch part of the second metal member.

4. A joining method of joining a first metal member with a second metal member by friction stir welding using a joining rotating tool which includes a stirring pin, at least an edge of each of the first metal member and the second metal member being formed to have a U-shaped cross section with a first horizontal plate projecting from a base edge of a first side surface of a vertical plate and with a second horizontal plate projecting from a top edge of the vertical plate, the first metal member including a first projecting part projecting outward from a front surface of the first horizontal plate, the second metal member including a second projecting part projecting from a top edge of the vertical plate in a longitudinal direction of the vertical plate, the joining method comprising:
an abutting step of forming an abutted part by abutting the front surface of the first horizontal plate of the first metal member against a second side surface of the vertical plate of the second metal member with a second side surface of the vertical plate of the first metal member and a front surface of the first horizontal plate of the second metal member made flush with each other and with the first projecting part of the first horizontal plate of the first metal member abutted against the second projecting part of the top edge of the vertical plate of the second metal member; and
a joining step of performing friction stir welding to the abutted part between the first metal member and the second metal member by inserting the stirring pin from the first projecting part and the second projecting part and moving the joining rotating tool along an inner corner at the top edge of the vertical plate of the second metal member while making only the stirring pin in contact with the first metal member and the second metal member.

5. The joining method as set forth in claim 1,
wherein the first metal member and the second metal member are each an extruded member.

6. The joining method as set forth in claim 2,
wherein the first metal member and the second metal member are each an extruded member.

7. The joining method as set forth in claim 4,
wherein the first metal member and the second metal member are each an extruded member.

* * * * *